(12) United States Patent
Wylonis

(10) Patent No.: US 10,577,076 B1
(45) Date of Patent: Mar. 3, 2020

(54) SHAPE-SHIFTING AIRCRAFT WING ACTUATED VIA POLYMER ARTIFICIAL MUSCLE DRIVEN TWISTING WING RIBS

(71) Applicant: Leo Edward Wylonis, Berwyn, PA (US)

(72) Inventor: Leo Edward Wylonis, Berwyn, PA (US)

( * ) Notice: Subject to any disclaimer, the term of this patent is extended or adjusted under 35 U.S.C. 154(b) by 0 days.

(21) Appl. No.: 16/389,023

(22) Filed: Apr. 19, 2019

(51) Int. Cl.
*B64C 3/52* (2006.01)
*B64C 3/18* (2006.01)

(52) U.S. Cl.
CPC ............... *B64C 3/52* (2013.01); *B64C 3/182* (2013.01); *B64C 3/185* (2013.01); *B64C 3/187* (2013.01)

(58) Field of Classification Search
CPC ........... B64C 3/52; B64C 3/182; B64C 3/185; B64C 3/187
USPC ........................................................ 244/204
See application file for complete search history.

(56) References Cited

U.S. PATENT DOCUMENTS

| | | | | |
|---|---|---|---|---|
| 4,247,066 A * | 1/1981 | Frost | ........................ | B64C 3/48 244/219 |
| 5,167,387 A * | 12/1992 | Hartwich | ............. | B64C 21/025 244/200 |
| 5,681,014 A * | 10/1997 | Palmer | ...................... | B64C 3/52 244/219 |
| 7,385,213 B2 * | 6/2008 | Chen | ....................... | G21F 5/015 250/506.1 |
| 7,909,292 B2 * | 3/2011 | Law | .......................... | B64C 3/18 244/219 |
| 9,764,819 B2 * | 9/2017 | Kendall | ..................... | B64C 3/42 |
| 9,784,249 B2 * | 10/2017 | Li | ........................ | H02N 11/006 |
| 9,856,012 B2 * | 1/2018 | Xi | ....................... | B64C 3/44 |
| 9,903,350 B2 * | 2/2018 | Li | ........................ | H02N 11/006 |
| 2017/0305525 A1 * | 10/2017 | Xi | ........................... | B64C 3/385 |
| 2019/0077496 A1 * | 3/2019 | Livieratos | ................ | B64C 3/52 |
| 2019/0127043 A1 * | 5/2019 | Krog | ......................... | B64C 3/00 |

* cited by examiner

*Primary Examiner* — Marc Burgess

(57) ABSTRACT

The present invention provides an apparatus and method for twisting a wing rib of an aircraft that when deployed across the wing span allows for a wide range of wing shape variations. This variance in shape may be used to steer the airplane without the use of flaps, and change the wings from a high-speed, low-lift shape to a low-speed, high-lift shape, including interim wing configurations, during flight to increase efficiency. The apparatus utilizes high strength-to-weight ratio polymer artificial muscles wrapped in heating wire as the rib twisting actuators. Wing rib twist is accomplished by electrifying the heating wire of the appropriate polymer artificial muscle to alter the wing rib twist. The wing rib apparatus includes a venting design that allows for faster activation of the wing rib twist by using ambient air convection to accelerate cooling of the relaxing polymer artificial muscle.

3 Claims, 7 Drawing Sheets

SHAPE-SHIFTING AIRCRAFT WING ACTUATED VIA POLYMER ARTIFICIAL MUSCLE DRIVEN TWISTING WING RIBS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention relates to the use of high strength-to-weight ratio polymer artificial muscles as actuators for controlled angle-of-attack change of aircraft wing ribs and thus as a method of imparting wing shape change to alter wing lift, optimize efficiency and steer the vehicle.

BACKGROUND

Historically, aircraft wing lift and drag flight characteristics are altered using trailing edge flaps (ailerons) and elevators. Shape-changing of a wing is a technique of achieving the goals of trailing edge flaps (ailerons) and elevators to steer the aircraft, and alter the lift-to-drag (efficiency) profile of the aircraft. Wing shape-changing has the added benefit of being more efficient than flaps due to the lower induced drag produced by sharp edges created by flaps.

Current methods of wing shape-changing that have been proposed include the use of motors and even pneumatic or fluid-based artificial muscles as actuators to change the shape of the wing in-flight. Due to the weight of traditional motors and air or fluid compressors used to activate fluid driven artificial muscles, as well as the associated mechanical moving parts to support the heavy motors or actuators, current designs limit wing shape change to simple curvature of the trailing edge of the wing or sub-optimally efficient segmentation of the wing into static and articulating sections. In other current designs, wing shape change is limited to simplistic changes to the cross-sectional shape of the airfoil or change to only a limited portion of the airfoil to minimize the use of heavy motors, air or fluid compressors and traditional motorized actuators.

Creation of a wing shape-changing design that incorporates a high strength-to-weight ratio installed-in-wing actuation method is desirable for individual wing-rib actuation flexibility and associated variability of wing shape change across the entire wing span. The present invention uses high strength-to-weight ratio polymer artificial muscles as actuators of a wing rib apparatus. The polymer artificial muscles and their associated creation are described in International Patent # WO2014/022667A2 to N. LI, et al, 2014. Use of these polymer artificial muscles as actuators within a wing rib allows for independent wing rib articulation and highly variable and controllable in-flight wing shape change for optimal efficiency and to steer the aircraft without the use of trailing edge flaps (ailerons) and elevators.

SUMMARY

The present invention provides an apparatus, method and system using high strength-to-weight ratio polymer artificial muscles as actuators for controlled angle-of-attack change of aircraft wing ribs and thus as a method of imparting wing shape change to optimize efficiency and steer the vehicle. The polymer artificial muscles contract with heat applied from electrically activated heating wire wrapped along the length of the polymer artificial muscle. The strong, light and compact nature of the heating wire wrapped polymer artificial muscle allows for the ability to design ribs of a wing span that may each individually twist around a fixed spar, thus creating highly variable wing shapes that are challenging to create with heavy and bulky traditional motors or fluid driven actuators.

The present invention includes an aircraft wing, comprising of multiple twisting ribs between a flexible wing surface, and actuated by opposing heating wire wrapped polymer artificial muscles, that independently change the angle of attack in response to control inputs. The independent twisting ribs comprise an outer structural plate and side structural plates in the shape of an airfoil, two opposing heating wire wrapped polymer artificial muscles connected under tension between a rear attachment and an airflow damper that is affixed to a hollow main spar, a solid secondary spar and a rear flexible spar installed between the wing root and wing tip, and temperature and rotational position sensors to monitor temperature activation of the heating wire wrapped polymer artificial muscles and rotational position, or angle of attack, of the twisting rib. The independent twisting ribs also incorporate forward and rear vents in the outer structural plate that serve to cool relaxing heat activated polymer artificial muscles through ambient air convection, when not heated or activated, and therefore accelerate the relaxation and rotational positioning of the twisting rib.

This wing design allows for variable shape change of the wing across the wing span. As the angle of attack of each rib may be separately controlled using electrical input to the heating wire of each heating wire wrapped polymer artificial muscle, the angle of attack of each rib can be variable and support overall wing shapes that are not possible without independently controllable wing ribs. This capability, applied to an aircraft, allows the wing of the aircraft to shift from a low-speed, high-lift and high-drag configuration during take-off to a high-speed, low-lift and low-drag configuration during cruise. Steering of the aircraft, without the use of flaps, may be accomplished with the present invention by simply differing the twisting rib angle-of-attack configuration from one side of the wing span to the other. In addition, through the ability of the present design to allow for articulation of independent wing ribs, rather than merely the outer ribs, the design can produce the same lift using less angle-of-attack deflection. This results in less drag and higher overall efficiency.

An additional feature that allows each twisting rib to be locked into a given rotational angle-of-attack position is also included in the present invention. This rotational angle-of-attack position lock allows the wing to be locked into a given shape for long cruising flights without electrical activation of the polymer artificial muscles, thus saving energy.

DETAILED DESCRIPTION OF THE PREFERRED EMBODIMENT

It should be understood that the present invention is not limited to the aerospace application described in this embodiment. It may be adapted to include, but not limited to, any other aerospace application, watercraft application, ground vehicle application, or any other use and/or application of an airfoil.

Figure 1:
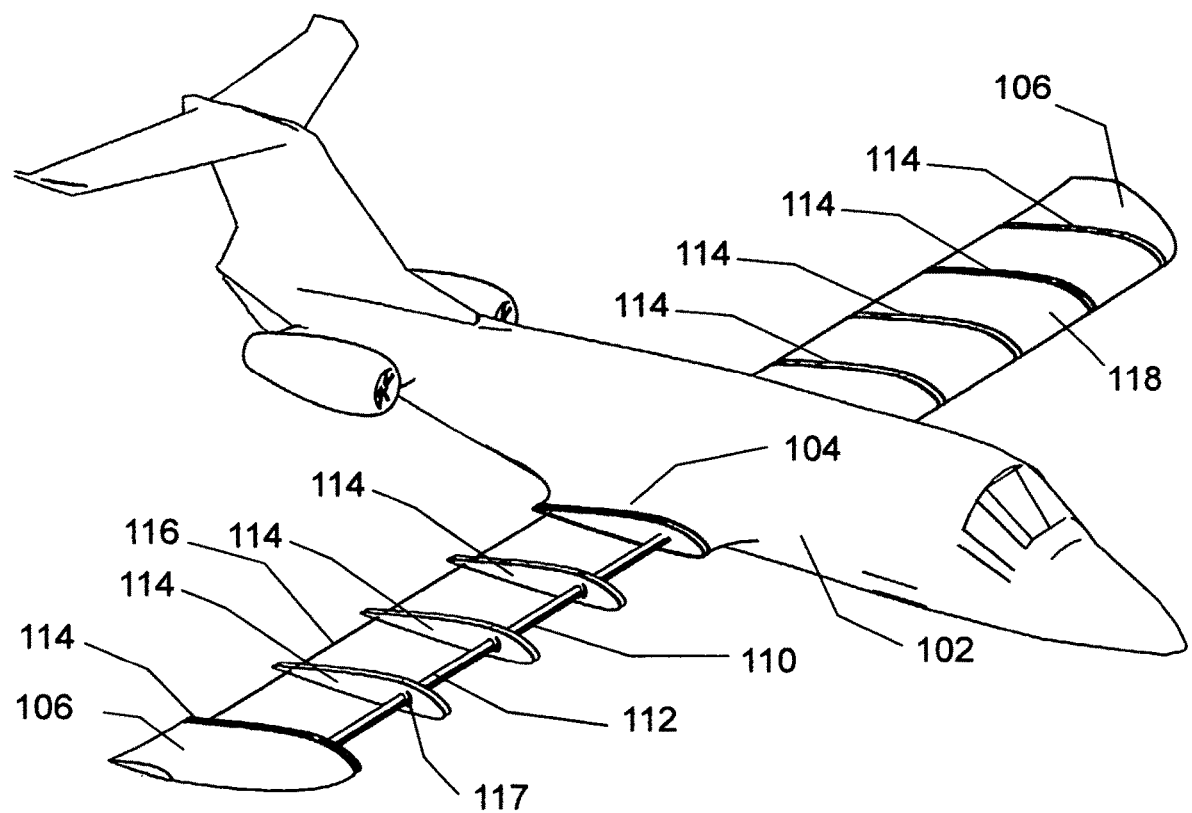
FIG. 1 shows a perspective view of an aircraft with a shape-changing wing that uses twisting ribs in accordance with the embodiment of the present invention.

FIG. 1 shows a perspective view of an aircraft with a shape-changing wing that uses independent twisting ribs in accordance with the embodiment of the present invention. The embodiment of the present invention uses independent twisting ribs (114) that rotate independently of one another around a fixed main spar (112) that is cylindrical in shape and hollow to support control input wires to electronics housed in the fuselage (102). A cylindrical solid secondary spar (110) extends through the independent twisting ribs (114) through safety stop slots (117) in the twisting ribs (114). A flexible spar (116) extends through the twisting ribs and has the ability to bend and stretch. In the present embodiment this flexible spar is made from an elastic material such as rubber. It is conceived that any number of methods to create an elastic spar may be used including the use of springs and other mechanical elastic methods. Both the main spar (112), the secondary spar (110) and the flexible spar (116) extend from the wing root (104) of the aircraft fuselage (102) to the wing tip (106). A flexible wing surface (118) extends between each independent twisting rib (114) and, in the present invention, is conceived of a load-bearing and elastic surface. As industry advancements in elastic aerospace materials are made, it is conceived that any number of materials or combinations of materials could meet the strength required.

Figure 2:
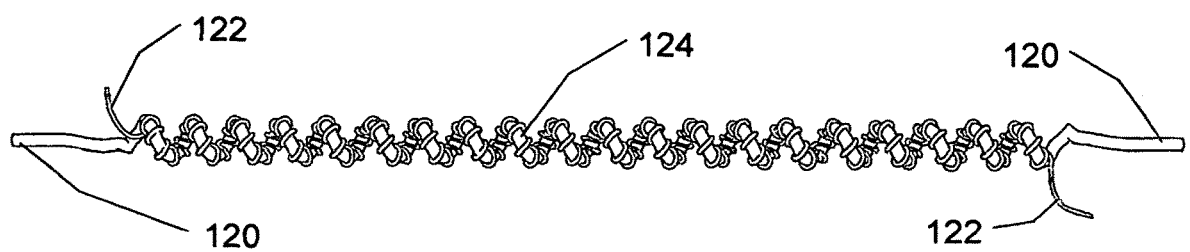
FIG. 2 illustrates a heating wire wrapped polymer artificial muscle (124) used in the present embodiment.

FIG. 2 illustrates a heating wire wrapped polymer artificial muscle (124) used in the present embodiment. The fundamental components for this type of artificial muscle include a polymer monofilament fiber (120), commonly used for fishing line, that is wrapped with a heating wire (122) that heats when electrically stimulated by aircraft control electronics. While the present invention conceives of using nichrome wire as the heating wire, any type or material of heating wire or method of heating the polymer monofilament fiber may be used including electrically and thermally conductive paints. The heating wire wrapped polymer artificial muscle (124) is made by first wrapping the heating wire (122) around the polymer monofilament fiber (120) by rotating both ends of the polymer monofilament fiber (120) in the same direction. Heating wire having a diameter approximately 20-25% of the diameter of the chosen polymer monofilament fiber is used in the present embodiment. After wrapping the heating wire around the polymer monofilament fiber, each end of the fiber is twisted in the opposite direction under a load until the fiber coils into a helical shape. The load required for the twisting process is approximately 2.5% of the weight capacity of the polymer monofilament fiber. The heating wire wrapped polymer monofilament fiber is then subjected to heat at a temperature of approximately, 100-120 degrees Celsius to anneal the polymer monofilament fiber into a helical shape. The twisting and subsequent annealing of the polymer monofilament fiber into helical polymer artificial muscle is in accordance with prior art. The above process produces a heating wire wrapped polymer artificial muscle (124) that contracts when control electronics deliver electrical current to the heating wire thus heating and contracting the polymer artificial muscle and has a high strength-to-weight ratio. The heating wire wrapped polymer artificial muscle (124) is initially installed under some tension stretching its helical shape. It then contracts in response to heat until the helical coils touch or the maximum force is reached.

Figure 3:
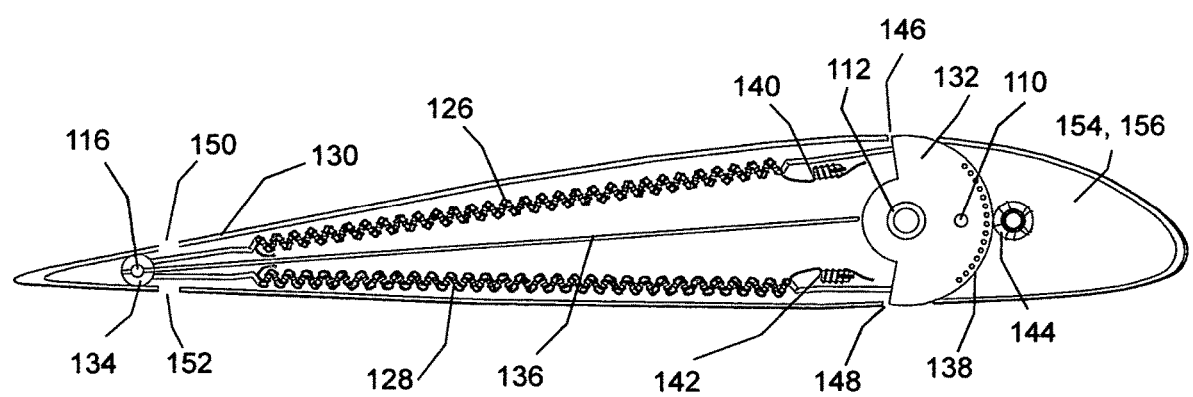
FIG. 3 is a cross-sectional view of the twisting rib (114) in accordance with the embodiment of the present invention.

FIG. 3 is a cross-sectional view of the twisting rib (114). The components of the twisting rib include a structural rib composed of left-side and right-side structural plates (154, 156) fabricated in the shape of the desired airfoil. An outer structural plate (130) connects the left-side and right-side structural plates (154, 156) and is cut in four locations as shown in FIG. 3 to create a top forward vent (146), bottom forward vent (148), top rear vent (150) and bottom rear vent (152). An airflow barrier (136) is installed between the left-side and right-side structural plates (154, 156). This barrier serves to create two separate compartments in the twisting rib, one for a top heating wire wrapped polymer artificial muscle (126) and one for an opposing bottom heating wire wrapped polymer artificial muscle (128). The two heating wire wrapped polymer artificial muscles (126, 128) are anchored to the rear of the twisting rib via a rear attachment (134) that also serves to support attachment of the flexible spar (116) at the rear of the twisting rib. An airflow damper (132) fabricated in the shape illustrated in FIG. 3, contains a hole through which the hollow main spar (112) penetrates and contains another hole through which the secondary spar (110) penetrates. Several angle-of-attack setpoint holes (138) are included near the outer edge of the airflow damper (132) as shown in FIG. 3. The opposing heating wire wrapped polymer artificial muscles (126, 128) are anchored between the rear attachment (134) and the airflow damper (132). They are installed under tension to allow for contraction of each heating wire wrapped polymer artificial muscle when electrical current is applied to each nichrome wire and therefore heat is applied to each polymer artificial muscle. A top temperature sensor (140) is installed in the twisting rib and wrapped with the nichrome wire from the top heating wire wrapped polymer artificial muscle (126). A bottom temperature sensor (142) is installed in the twisting rib and wrapped with the nichrome wire from the bottom heating wire wrapped polymer artificial muscle (128). The embodiment of the present invention conceives of the use of a thermistor or thermopile as the temperature sensors (140, 142), however any temperature sensing device may be used. An angle-of-attack sensor (144), that measures changes via rotation, is installed adjacent to the airflow damper and is directly connected to one or both of the side structural plates (154, 156). The angle-of-attack sensor is installed such that as the left-side and right-side structural plates (154, 156) of the twisting rib rotate around the main spar (112) the static airflow damper (132) causes a rotation in the angle-of-attack sensor (144) through a geared or friction fit surface interfacing the airflow damper and the angle-of-attack sensor. It is conceived that a rotational potentiometer is used in the embodiment of the present invention, however, other rotational position sensors including flex sensors may be used to sense rotation of the twisting rib and therefore angle-of-attack changes. During actuation of the heating wire wrapped polymer artificial muscles (126, 128) the temperature sensors (140, 142) also experience the same heat and may be used to monitor the temperature of the muscles to prevent overheating and optimize actuation of the twisting rib.

Figure 4:
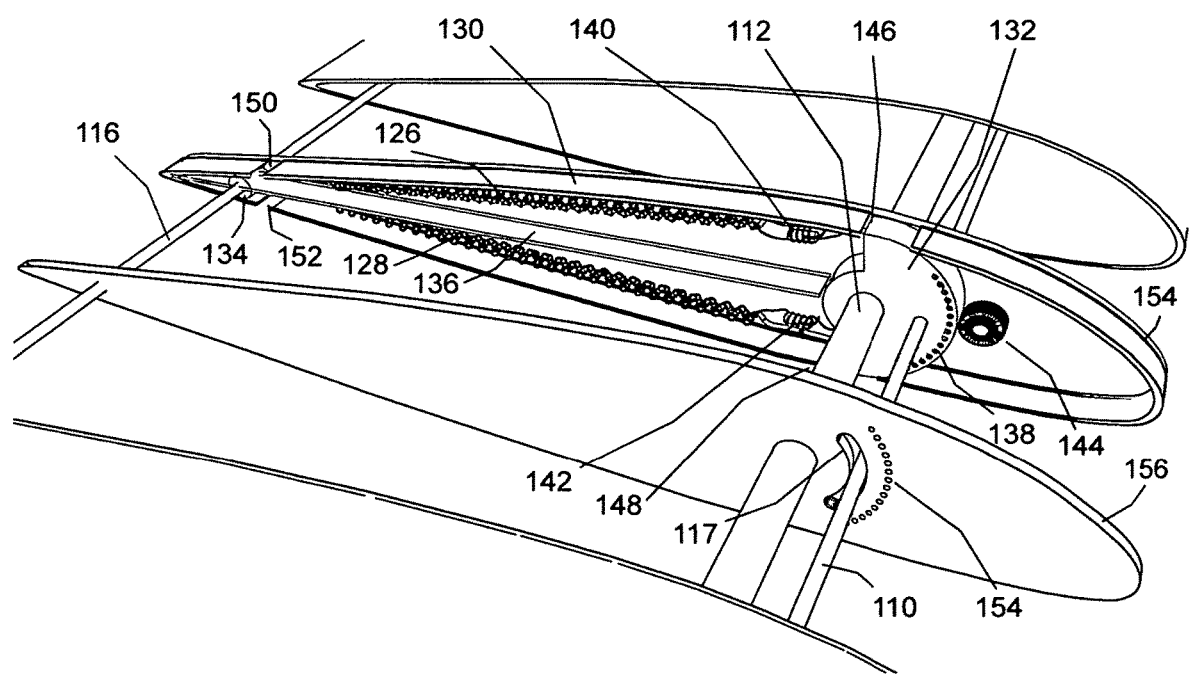
FIG. 4 is a break away perspective view of the twisting rib (114) in accordance with the embodiment of the present invention.

FIG. 4 is a break away perspective view of the twisting rib (114) and serves to illustrate how the outer structural plate (130) and the left-side and right-side structural plates (154, 156) fit together to close the twisting rib (114). FIG. 4. also shows how the secondary spar (110) passes through the left-side and right-side structural plates (154, 156) through a safety stop slot (117) that is curved such that the twisting rib can rotate. The length of the safety stop slot (117) determines the maximum positive and maximum negative angle of rotation from the level position. This length of the safety stop slot (117) and maximum positive and negative rotation angle may be set to protect the heating wire wrapped polymer artificial muscles (126, 128) from damage due to over extension due to external forces on the wing such as turbulence.

Figure 5:
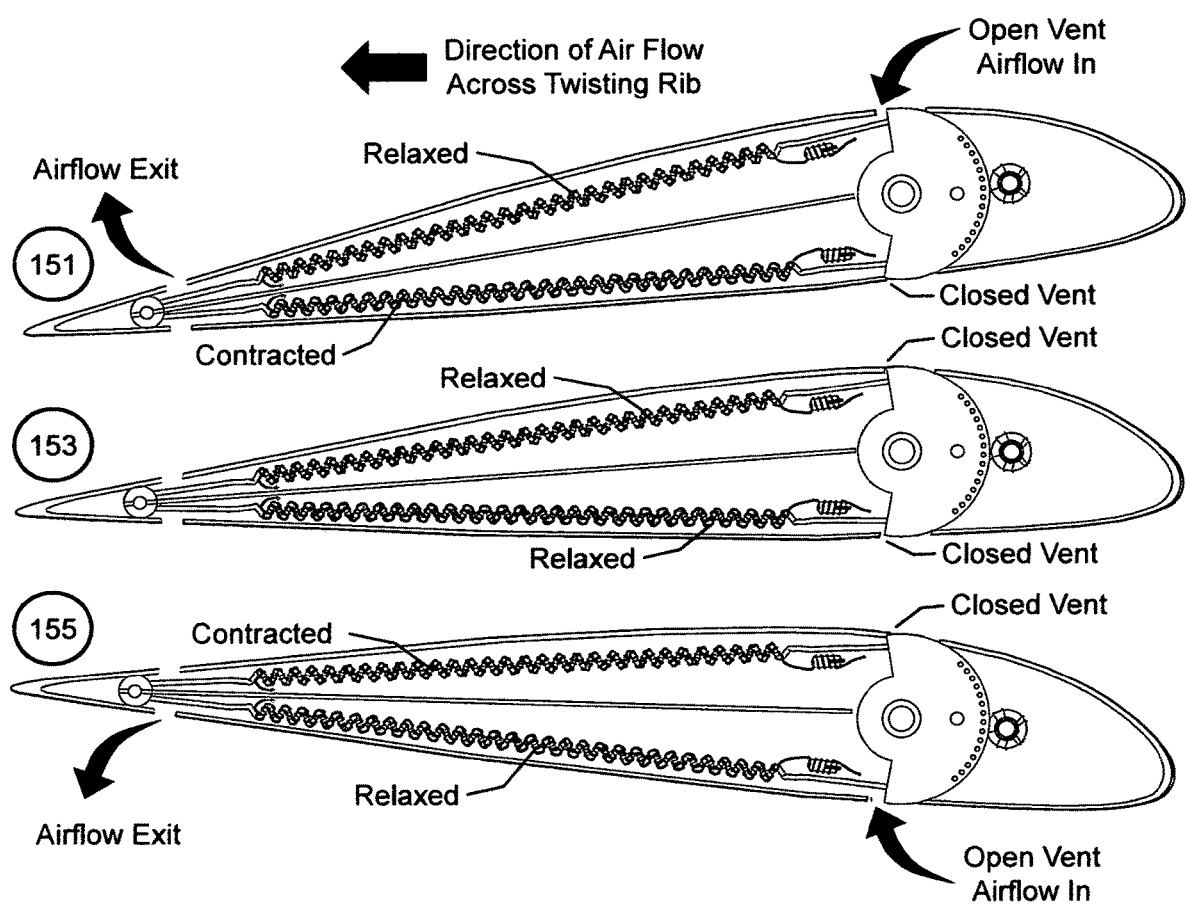
FIG. 5 shows a cross-sectional view of the twisting rib (114) in three positions and serves to demonstrate the automation of the embodiment of the present invention.

FIG. 5 shows a cross-sectional view of the twisting rib (114) in three positions and serves to demonstrate the automation of the embodiment of the present invention. The twisting rib is shown in level position (153) in which the top and bottom heating wire wrapped polymer artificial muscles are not activated by heat from the heating wire and therefore are in a relaxed state. To achieve a high-lift or positive angle-of-attack position (151) electrical current is applied to the heating wire of the bottom polymer artificial muscle. The bottom polymer artificial muscle contracts and the angle of attack of the twisting rib increases. This positive change in the angle of attack also serves to open the top forward vent allowing air to enter the top forward vent and exit the top rear vent. The twisting rib is also shown in a low-lift or negative angle-of-attack position (155) in which electrical current is applied to the heating wire of the top polymer artificial muscle. The top polymer artificial muscle contracts and the angle of attack of the twisting rib decreases. This negative change in the angle of attack also serves to open the bottom forward vent allowing air to enter the bottom forward vent and exit the bottom rear vent. The convection airflow through the chamber of the relaxed polymer artificial muscle of the twisting rib ensures that the non-heat activated polymer artificial muscle is relaxed (cool) when the activated muscle is heated (contracted). This convection airflow of the relaxed polymer artificial muscle serves to speed the cooling and therefore the actuation and achievement of the desired angle-of-attack position of the twisting rib.

Figure 6:
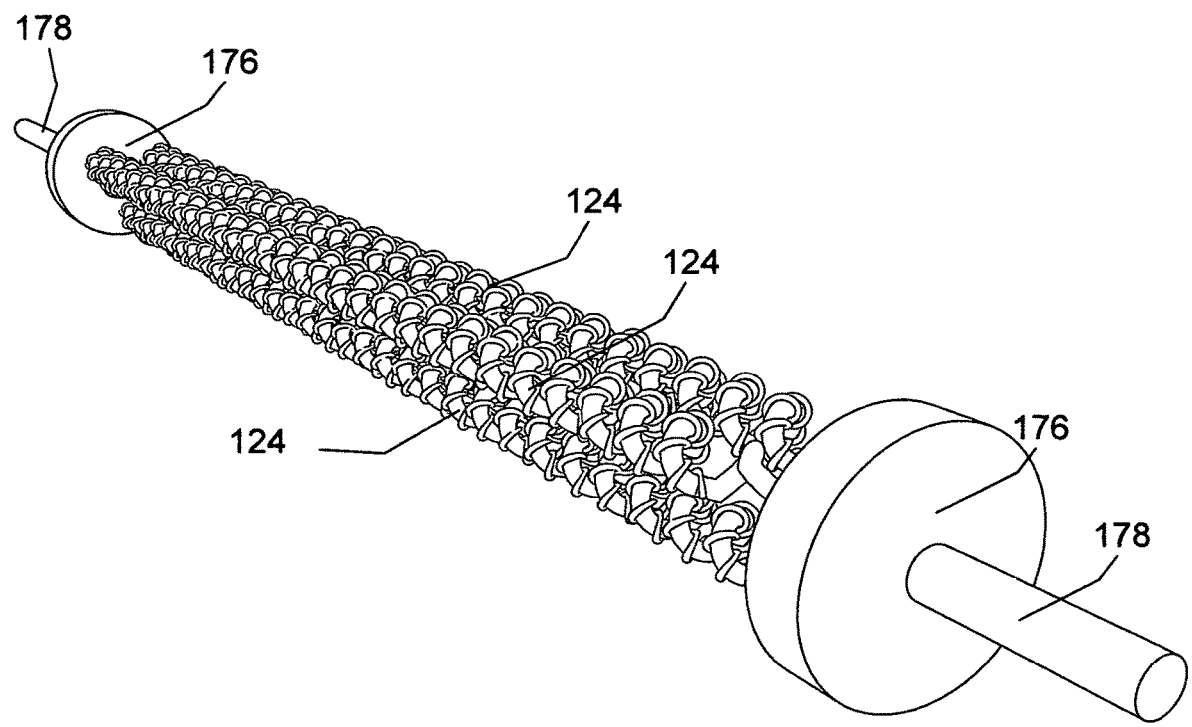
FIG. 6 shows a perspective view of three heating wire wrapped polymer artificial muscles connected to an attachment plate and a connection shaft on either end.

FIG. 6 shows a perspective view of three heating wire wrapped polymer artificial muscles connected to an attachment plate (176) and a connection shaft (178) on either end. While FIG. 3 and FIG. 4 illustrate the embodiment of the invention utilizing only one top and one bottom heating wire wrapped polymer artificial muscle in each twisting rib, multiple heating wire wrapped polymer artificial muscles may be configured as showing in FIG. 6 to provide increased contraction strength as required by the size of aircraft utilizing the twisting ribs.

Figure 7:
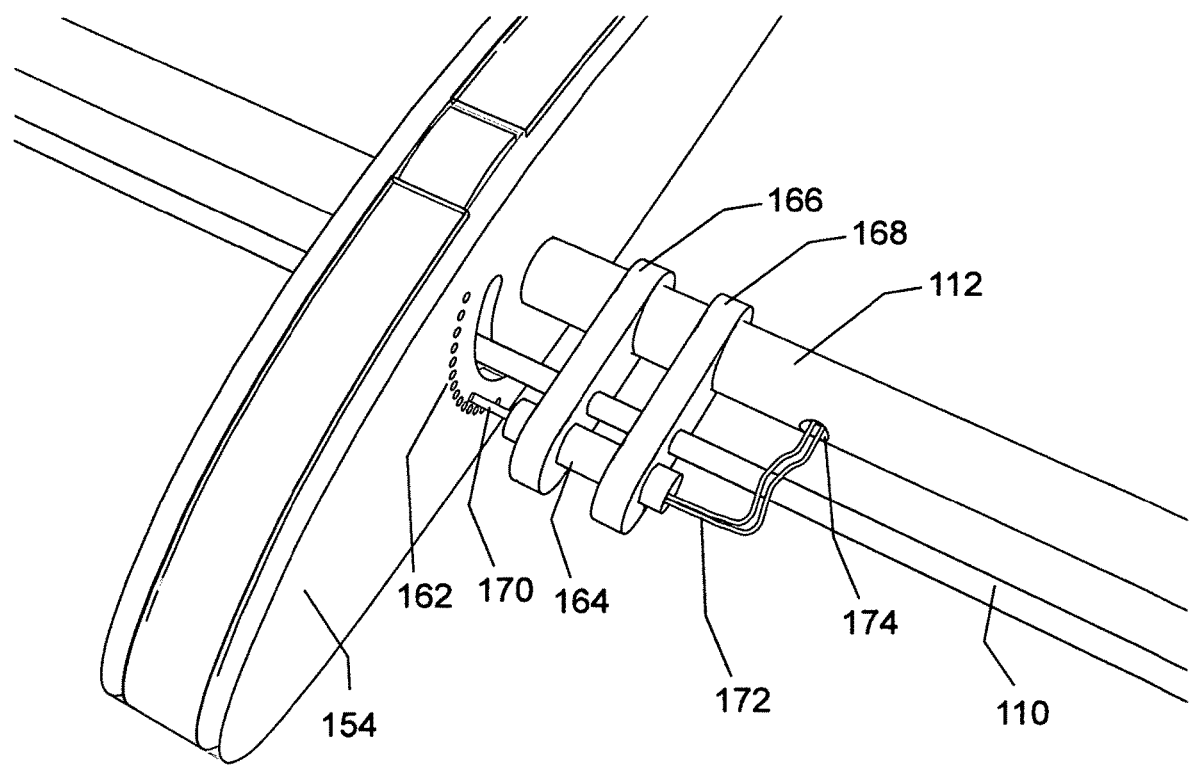
FIG. 7 shows a perspective view of a feature of the twisting rib that allows the twisting rib to be locked in a positive or negative angle-of-attack position.

FIG. 7 shows a perspective view of a rotational lock device that may be installed on each independent twisting rib that allows the independent twisting rib to be locked in a positive or negative angle-of-attack position, once that position has been achieved through the activation of the appropriate opposing heating wire wrapped polymer artificial muscle. A linear actuator (164) is physically attached to the main spar (112) and secondary spar (110) of the wing through actuator supports (166, 168). Electrical wires (172) powering the linear actuator are routed through a hole (174) in the hollow main spar (112). The output shaft (170) of the linear actuator (164) is aligned with the angle-of-attack setpoint holes in the side structural plate (154) and the angle-of-attack setpoint holes (138) in the airflow damper (132) shown in FIG. 4. When the desired angle of attack of the twisting rib is achieved, the output shaft of the linear actuator is extended and the angle of attack is locked into place with no further electrical heating activation of the opposing heating wire wrapped polymer artificial muscles. The physical locking of the achieved position allows for a reduction in energy consumption to sustain the position of the independent twisting rib through electrical current applied to an opposing heating wire wrapped polymer artificial muscle. Thus, for a sustained phase of flight such as cruising, an optimal angle of attack of the independent twisting ribs of the wing may be locked-in and no energy applied to the independent twisting ribs providing enhanced energy efficiency for the aircraft.

What is claimed is:

1. An aircraft wing, comprising:
   a flexible wing surface;
   a main spar, a secondary spar, and a rear flexible spar connected between a wing root and wing tip within the flexible wing surface; and
   a plurality of independent twisting ribs installed within the flexible wing surface and attached to the main spar, secondary spar, and rear flexible spar, the independent twisting ribs configured to twist independently of each other in order to vary wing shape, wing lift, wing efficiency and steer the aircraft, each independent twisting rib comprising:
      two opposing heating wire wrapped polymer artificial muscles connected under tension between a rear attachment and an airflow damper such that when one of the opposing heating wire wrapped polymer artificial muscles is heated and therefore contracted in response to control inputs, the independent twisting rib rotates about the main spar and changes angle of attack;
      an outer structural plate and two side structural plates in the shape of an airfoil;
      a temperature sensor to monitor temperature activation of the opposing heating wire wrapped polymer artificial muscles;
      a rotational position sensor to monitor rotational position, or angle of attack, of the independent twisting rib; and
      forward and rear vents consisting of gaps in the outer structural plate, and aligned with the airflow damper such that when one of the opposing heating wire wrapped polymer artificial muscles is heated and therefore contracted and the independent twisting rib is rotated in one direction, the outer structural plate rotates such that one set of the forward and rear vents move to a position wherein said one set of vents is obscured by the airflow damper to stop air convection cooling of the opposing heating wire wrapped polymer artificial muscle that is heated, and the other set of the forward and rear vents move to a position wherein said other set of vents is not obscured by the airflow damper to provide air convection cooling, thereby accelerating the contraction and relaxation of the opposing heating wire wrapped polymer artificial muscles and thus the rotational positioning of the independent twisting rib.

2. The aircraft wing of claim 1, wherein each independent twisting rib comprises a rotational lock device, the rotational lock device comprising:

matching angle of attack setpoint holes formed the airflow damper and the side structural plates; and a linear actuator with an output shaft configured to engage the angle of attack setpoint holes in the airflow damper and the side structural plates to lock the independent twisting ribs in a desired position.

3. The aircraft wing of claim 1, wherein the independent twisting-ribs and their internal components, the main spar, the secondary spar, the rear flexible spar, and the flexible wing surface are fabricated of materials structurally sufficient to support the dynamic and static loads on the wing.

* * * * *